Dec. 12, 1939.    J. M. RUSNAK    2,183,172
UNIVERSAL DIE SINKER
Original Filed Oct. 12, 1937    2 Sheets-Sheet 2

INVENTOR
John M. Rusnak
BY
ATTORNEY

Patented Dec. 12, 1939

2,183,172

UNITED STATES PATENT OFFICE 2,183,172

UNIVERSAL DIE SINKER

John M. Rusnak, West Hartford, Conn., assignor to Niles-Bement-Pond Company, Hartford, Conn., a corporation of New Jersey Original application October 12, 1937, Serial No. 168,634. Divided and this application January 25, 1939, Serial No. 252,806

6 Claims. (Cl. 90—14)

This invention relates to die sinking machines and particularly to a die sinking machine of the type having means for actuating the cutter and the head within which the cutter is mounted in an arcuate path of different predetermined radii.

A primary object of the invention is to provide improved supporting and actuating means for the movable head within which the cutter or tool spindle is slidably and rotatably mounted so that the head can be actuated in a path of any radius by hand or power means.

It is another object of the invention to provide an improved bearing member in the movable head for one of the eccentrics on which the head is mounted, this bearing cooperating with a fixed bearing in the head for the other eccentric to prevent cramping or binding of the movable head relative to its bearings during its movements in the arc of circles of any radius.

The features of construction forming the present invention constitute improvements upon the die sinking machine described and claimed in the patent to Bayrer 1,354,942, granted October 5, 1920; and this application is a division of my application Serial No. 168,634 filed October 12, 1937, Patent No. 2,161,683, June 6, 1939.

With the above and other objects in view, the invention may include the features of construction and operation set forth in the following specification and illustrated in the accompanying drawings.

In the accompanying drawings annexed hereto and forming a part of this specification, I have shown the invention embodied in a motor driven die sinking machine of the vertical spindle universal type, but it will be understood that some of the features of the invention can be embodied in other machine tools and that the drawings are not to be construed as defining or limiting the scope of the invention, the claims appended to this specification being relied upon for that purpose.

Figure 1:
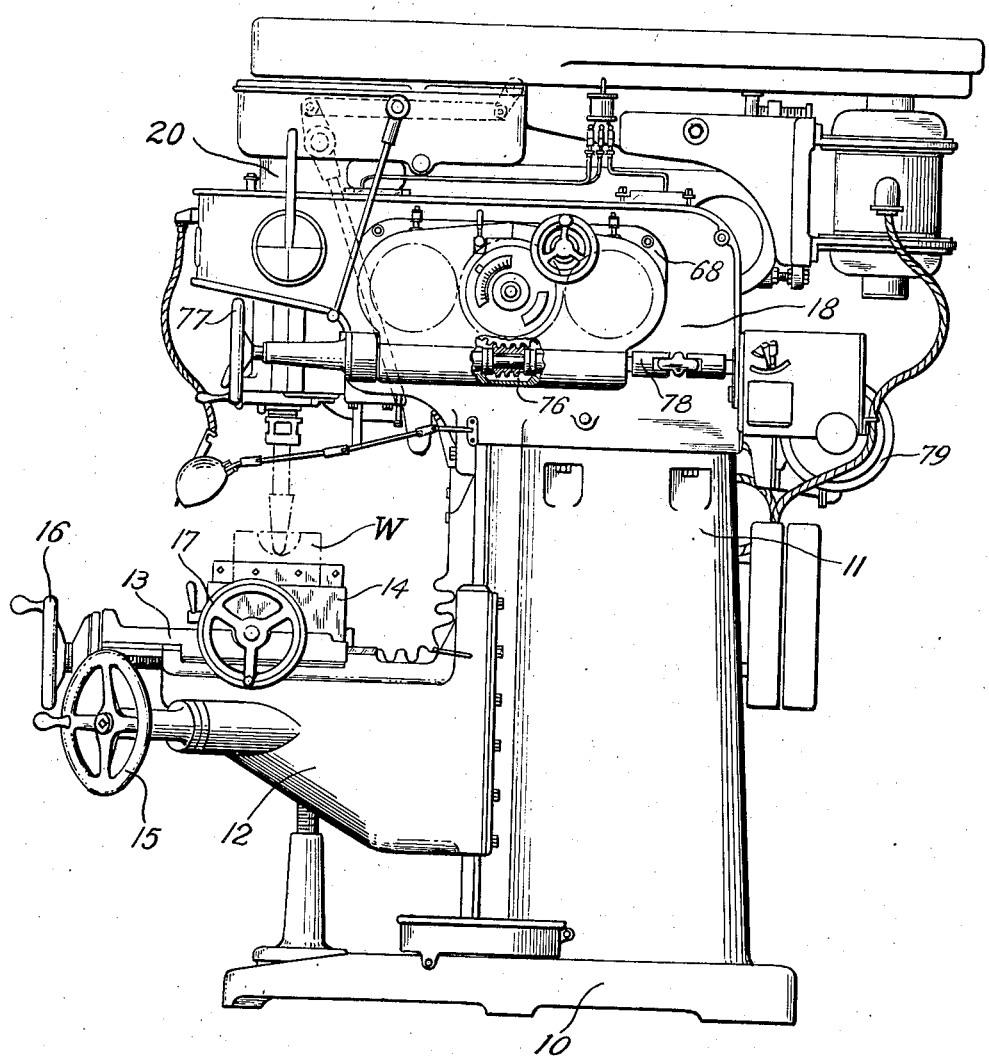
Figure 1 is a complete side elevation of a die sinking machine in which the present invention is incorporated.

In the above-mentioned drawings there has been shown but one embodiment of the invention which is now deemed preferable, but it is to be understood that changes and modifications may be made within the scope of the appended claims without departing from the spirit of the invention.

Briefly and in its broadest aspect, the invention may include the following principal parts: first, a base having a column portion; second, a head supported within a fixed upper part of the base and movable in a vertical plane in any direction; third, spaced adjustable eccentrics rotatably supported within the upper fixed portion of said base for moving the head in arcuate paths while maintaining the axis of the cutter spindle at all times vertical; fourth, means to simultaneously adjust the eccentricity of said eccentrics; fifth, means to simultaneously rotate the eccentrics in any adjusted position so that a cutter mounted at the lower end of said spindle may be moved in arcuate paths of any predetermined radii; sixth, an integral cylindrical bearing formed in the movable head for engagement with one of said eccentrics; and seventh, an arcuate bearing member partially engaging the other of said eccentrics and supported adjustably within the head for limited free angular and linear movements in any direction.

Referring more in detail to the figures of the drawings, I provide a base 10 having a column portion 11 on which is adjustably mounted for vertical movement a work supporting bracket or knee 12. On the upper horizontal surface of this bracket or knee 12 is slidably mounted a saddle 13 movable toward and from the column and carrying a work supporting table 14 movable transversely thereon. A work piece W being operated on may be clamped in position on this table 14. The above described work supporting and positioning means are or may be those usually forming parts of a standard die sinking machine and may be adjusted by means of hand wheels 15, 16 and 17 respectively for operating the knee 12, saddle 13 and table 14.

The base 10 at the upper end of the column portion 11 is in the form of a fixed head portion 18 secured rigidly to the column 11 as shown. This fixed head 18 has suitable parallel side surfaces between which is movably mounted a cutter supporting head 20 presently to be more fully described. Within this movable head 20 is a vertically disposed cutter spindle 21 mounted adjacent one end. Preferably and as shown in the figures, this spindle 21 is rotatable within a vertically adjustable sleeve 22 so that the spindle 21 may be vertically adjusted toward and from the table 14. A cutter or tool 23 may be clamped by any usual means within the lower end of the spindle 21. In order to effect vertical movements of the sleeve 22 and cutter spindle 21, there is provided a vertical screw 24 engaging a nut 25 secured to an intermediate portion of the sleeve 22 so that by rotation of this screw 24 by any suitable means (not shown) the sleeve 22 and spindle 21 may be moved up or down.

Figures 2, 3:
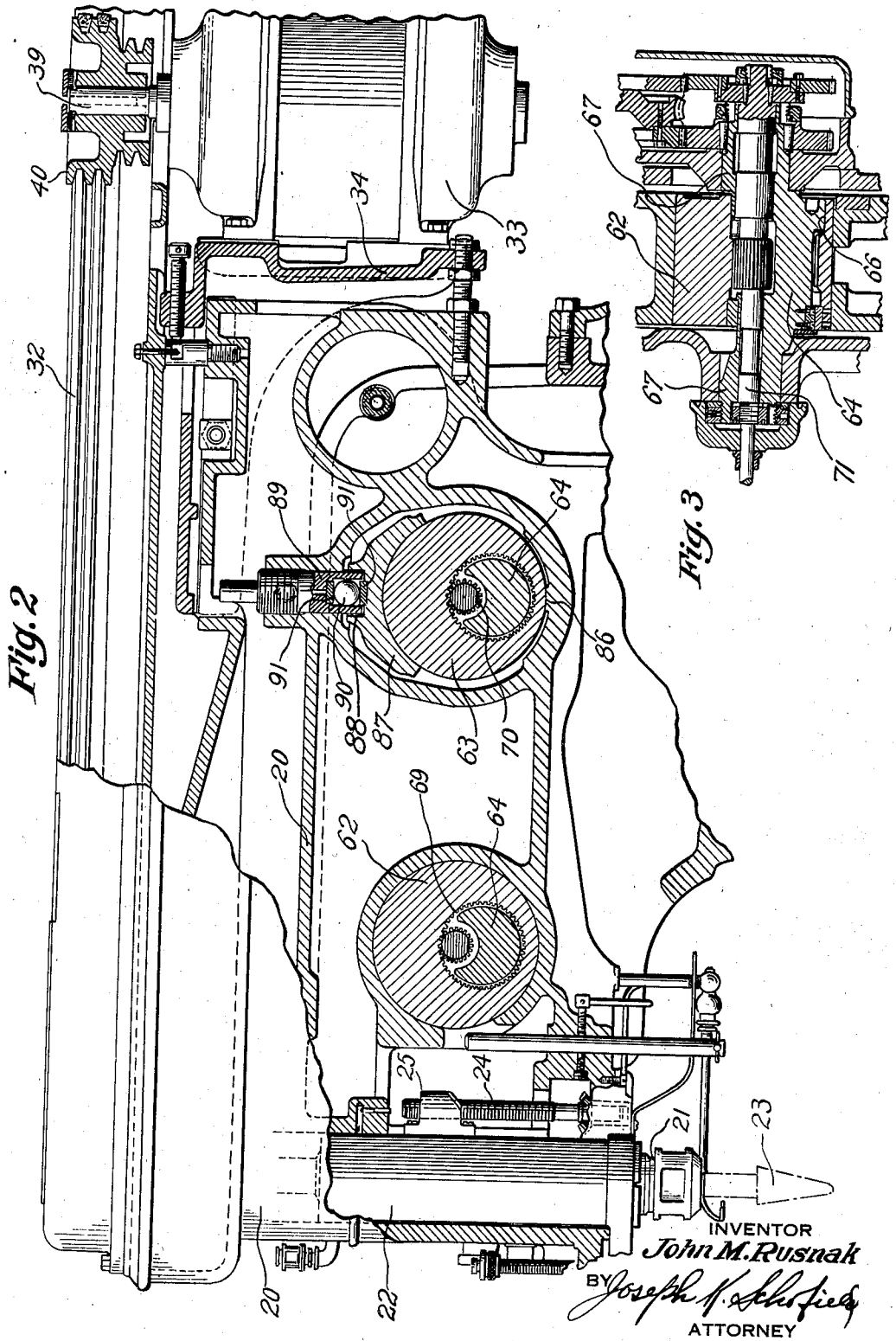
Fig. 2 is an elevation taken centrally through the tool supporting head and showing the bearings for this head in section.
Fig. 3 is a partial transverse sectional view showing one of the eccentrics and its shaft.

The movable head 20 mounting the cutter spindle 21 and sleeve 22 is supported upon eccentric sleeves 62 and 63 shown in section in Fig. 2. These eccentric sleeves 62 and 63 are similar to each other and form parts of eccentrics of the compound type, there being two eccentrics, one within the other relatively adjustable to vary the eccentricity of the eccentric sleeve 62 or 63 relative to the axis of shafts 64 on which they are mounted. The construction of each of these compound eccentrics is similar and the means for adjusting their eccentricity is similar so that but one will require description. As will be seen in Fig. 2, the sleeves 62 and 63 are mounted upon inner eccentric surfaces 66 formed integrally with the shafts 64. Preferably these inner eccentrics 66 formed upon the shafts 64 have bearing portions or journals 67 on opposite sides of the eccentric surfaces 66 and are supported in fixed positions for rotation within the fixed head portion 18, there being a cover plate 68 rigidly fastened to the base and forming one side of the fixed head 18 in order to permit assembly of these eccentrics. Closely surrounding each inner eccentric surface 66 is the eccentric sleeve 62 and 63. These sleeves have internal gear teeth 69 formed therein and meshing with the teeth of a pinion 70 upon the central portion of shaft 71 extending through the shaft 64 and inner eccentrics 66 coaxially of their journal portions 67.

The eccentrics 62 and 63 shown in Figs. 2 and 3 are rotated in synchronism by means of gears secured to one end of their supporting shafts 64. As this part of the construction forms no part of the present invention, further description is not thought to be necessary. It will suffice to state that a worm 76 supported horizontally within the cover plate 68 when rotated will slowly rotate the eccentrics 62 and 63 simultaneously and will therefore actuate the movable spindle head 20 in a closed arcuate path. The worm 76 by means of which the eccentrics 62 and 63 are rotated may be manually rotated by a hand wheel 77 on the forward end of its shaft 78. If desired, however, a small motor 79 may be mounted on a portion of the fixed head 18 drivingly connected to the worm shaft 78 through suitable telescoping and jointed connections. The means to vary the radius of the arcuate movement of the head 20 correspond closely to those described in the above referred to patents, and therefore will not need to be further described.

It has been found that due to unavoidable inaccuracies in manufacture or inaccurate alinement and adjustment of the parts supporting the movable head 20 that a cramping action may occur in the bearings for the head which prevents smooth and easy rotation of the eccentric driving mechanism to move the tool 23 in an arcuate path. It is therefore a primary feature of the present invention to eliminate the possibility of the eccentrics 62 and 63, upon which the movable head 20 is supported, becoming cramped by lack of accurate adjustment or misalinement or unavoidable errors in manufacture. With the possibility of the eccentrics becoming cramped eliminated, uniformly free movement of the head 20 is assured. As shown in Fig. 2, the eccentric sleeve 62 adjacent the cutter spindle 21 is directly mounted within a fixed cylindrical surface formed directly within the movable head 20. This front eccentric 62, therefore, accurately controls the vertical and lateral positions of the cutter head 20 at all times. The rear eccentric 63 more remote from the cutter spindle 21 is mounted within the head 20 by a special and improved bearing member and support shown clearly in Fig. 2.

It will be seen by reference to Fig. 2 that the movable head 20 is cut away to form an enlarged recess surrounding the sleeve 63 forming the rear eccentric, there being a small arcuate surface 86 only integral with the movable head 20 and bearing against the lowermost portion of sleeve 63. The upper surface of the eccentric sleeve 63 upon which the weight of the movable head 20 is principally supported bears against an inserted arcuate member 87 conforming to the surface of the eccentric and which is so mounted within the head 20 that it is free to adjust itself within limited distances either laterally or by tilting or by movement angularly about a vertical axis.

Preferably this arcuate bearing member 87 may have a central recess 88 within its upper portion within which may loosely fit a vertically disposed stud 89 adjustably threaded within the movable head 20. A ball 90 of relatively large diameter inserted within the recess 88 and within the recessed lower end of the stud 89 is positioned between bearing plates 91, one plate being mounted in the arcuate member 87 and the other directly thereabove in the stud 89. With this construction and with the ball 90 forming the weight supporting member, the arcuate member 87 is free to tilt slightly about a horizontal axis or about a vertical axis or may move slightly laterally within the recess 88. By means of this freedom of movement cramping action between the eccentric sleeves 62 and 63 and the movable head 20 in any adjustment or in any driving position thereof is prevented.

What I claim is:

1. A die sinking machine comprising in combination, a base, a head having a tool spindle slidably and rotatably mounted therein, means for moving said head in a closed path while maintaining said spindle in parallel positions, a pair of spaced adjustable eccentrics for movably supporting said head in said base, said head having a bearing surface directly engaging one of said eccentrics, a pivotal member supported for limited movement within said head engaging the other of said eccentrics, and means to simultaneously rotate said eccentrics.

2. A die sinking machine comprising in combination, a base, a head having a tool spindle slidably and rotatably mounted therein, means for moving said head in a closed path while maintaining said spindle in parallel positions, a pair of spaced adjustable eccentrics for movably supporting said head in said base, said head having a fixed cylindrical bearing surface directly engaging one of said eccentrics, a member supported for limited lateral and pivotal movements within said head engaging the other of said eccentrics, and means to simultaneously rotate said eccentrics.

3. A die sinking machine comprising in combination, a base, a head having a tool spindle slidably and rotatably mounted therein, means for moving said head in a closed path while maintaining said spindle in parallel positions, adjustable eccentrics for movably supporting said head in said base, said head having an integral cylindrical surface directly engaging one of said eccentrics, an arcuate member adjustably mounted for limited movement in any direction engaging the other of said eccentrics, and means to simultaneously rotate said eccentrics.

4. A die sinking machine comprising in combination, a base, a head having a tool spindle slidably and rotatably mounted therein, means for moving said head in a closed path while maintaining said spindle in parallel positions, adjustable eccentrics for movably supporting said head in said base, said head having an integral cylindrical surface directly engaging one of said eccentrics, an arcuate member adjustably mounted for limited movement laterally and pivotally in any direction engaging the other of said eccentrics, and means to simultaneously rotate said eccentrics.

5. A die sinking machine comprising in combination, a base, a head having a tool spindle slidably and rotatably mounted therein, means for moving said head in a closed path while maintaining said spindle in parallel positions, adjustable eccentrics for movably supporting said head in said base, said head having an integral cylindrical surface directly engaging one of said eccentrics, an arcuate member adjustably mounted for limited movement laterally and pivotally in any direction engaging the upper portion only of the other of said eccentrics, and means to simultaneously rotate said eccentrics.

6. A die sinking machine comprising in combination, a base, a head having a tool spindle slidably and rotatably mounted therein, means for moving said head in a closed path while maintaining said spindle in parallel positions, adjustable eccentrics for movably supporting said head in said base, said head having an integral cylindrical surface directly engaging one of said eccentrics, an integral arcuate portion of said head engaging the lower portion of the other of said eccentrics, a member adjustably mounted for limited movement laterally and pivotally in any direction engaging the upper portion only of said last mentioned eccentric, and means to simultaneously rotate said eccentrics.

JOHN M. RUSNAK.